Patented Mar. 26, 1929.

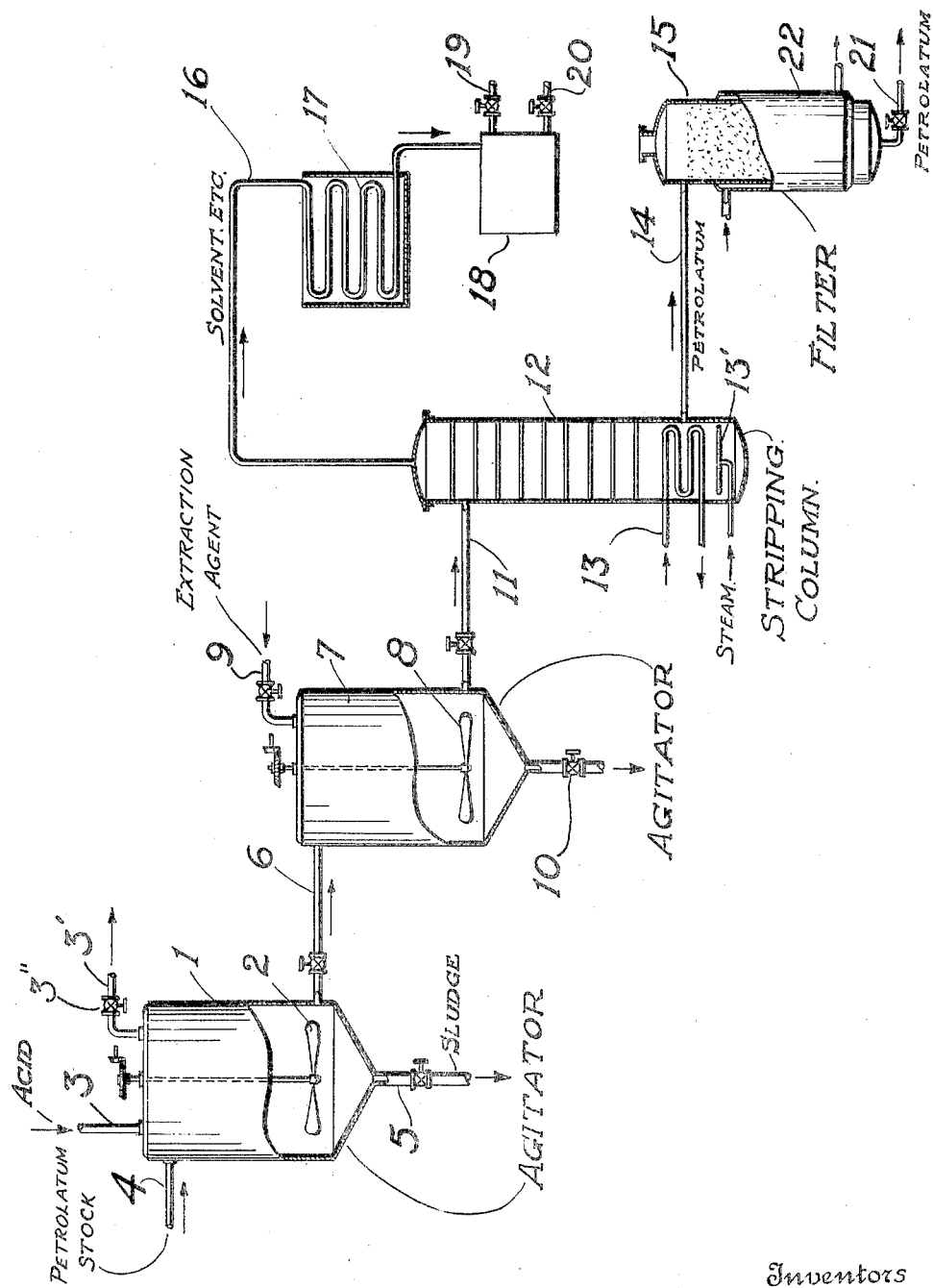

1,707,187

UNITED STATES PATENT OFFICE.

ERNEST B. COBB, OF JERSEY CITY, AND AUGUST HOLMES, OF NEWARK, NEW JERSEY, ASSIGNORS TO STANDARD OIL DEVELOPMENT COMPANY, A CORPORATION OF DELAWARE.

PROCESS FOR MAKING WHITE PETROLATUM.

Application filed October 27, 1925. Serial No. 65,085.

This invention relates to improvements in processes and apparatus for preparing petrolatum, and the like, by acid treatment. In accordance with our invention, the petrolatum is dissolved in a relatively volatile and acid-resisting liquid and is treated while in solution with fuming sulfuric acid.

This and other novel features of the invention will be fully understood from the following description, taken in connection with the accompanying drawing, in which the figure is a diagrammatic side elevation of equipment suitable for use in carrying out the process.

Referring to the drawing, reference numeral 1 denotes an agitator tank having a stirrer 2, and acid inlet pipe 3 and a vent pipe 3' for gases formed during the reaction. A valve 3", which may be used to regulate pressure, is installed in pipe 3'. A pipe 4 serves for introducing petrolatum solution into the agitator, or the solution may be made up in the agitator. A pipe 5 is provided for withdrawing sludge, and a pipe 6 for forwarding the acid-treated solution to an extraction tank 7, in which a stirrer 8 may be arranged. A pipe 9 conveys the extraction agent to the tank 7, and a pipe 10 serves for withdrawing the extraction product.

The reaction mixture is drawn from the extraction tank through pipe 11 to a stripping column 12, or similar means, which may be heated at the bottom by a steam coil 13. Steam may be injected into the tower through a spray-head 13'. The petrolatum from the lower portion of the stripping column is conveyed through a pipe 14 to a filter 15, preferably charged with clay. The solvent or solvents vaporized in the stripping column are passed through pipe 16 to the condenser 17, which discharges into a receiving tank 18. This tank may be provided with draw-off lines 19 and 20 arranged at different levels, so that solvents of different specific gravities may be separately removed. The petrolatum product is drawn off through pipe 21. The petrolatum is maintained in a suitable fluid condition in filter 15 by means of a steam jacket 22, or other suitable means.

The following example is illustrative of a preferred embodiment of our invention: Crude petrolatum is dissolved in a suitable solvent of relatively high volatility, such as naphtha. The boiling range of the naphtha is preferably about 90° to 165° C. Sufficient naphtha should generally be used to make a solution of about 10 parts by weight of petrolatum to 90 parts by weight of naphtha. More concentrated solutions may be used, if desired, up to the point at which petrolatum may tend to separate out.

Fuming sulfuric acid, preferably 20% oleum, is added in portions through pipe 3 to the agitator 1 containing the petrolatum solution. The mixture is agitated and then allowed to settle after each addition of acid, and the sludge formed is drawn off through pipe 5 before more acid is added. By acid treating in the presence of a solvent we are able to obtain a very fluid sludge that can easily be removed. One or two acid treatments are frequently sufficient, but more may be given in accordance with the requirements of the stock being treated. The total weight of acid may be from about 75% to 150% of the weight of the crude petrolatum. The yield of white petrolatum from the filter is ordinarily increased when high percentages by weight of acid are used. The temperature of the reaction may be around 65° C. Ordinarily no cooling means is necessary, since the violence of the reaction is diminished by the presence of the relatively inert solvent.

The dark or black reaction mixture is passed through pipe 6 to the extraction tank 7, in which it is washed with a suitable liquid for extracting sulfonic compounds and other impurities. Dilute isopropyl alcohol (about a 50% aqueous solution) is suitable for this purpose, but other solvents may be used. The reaction mixture should be washed with the alcohol solution until the color of the alcohol extract drawn off through pipe 10 remains approximately constant.

The petrolatum solution is passed from the extractor through pipe 11 to the stripping column 12, in which the naphtha, alcohol, and other volatile compounds are vaporized and taken off through pipe 16, for recovery and return to the process. Steam is preferably injected into the lower portion of the stripping column 12 through head 13', so that the solvent is expelled and the petrolatum steamed simultaneously.

The petrolatum is withdrawn from the stripping column through pipe 14 and passed through the filter 15. This is preferably charged with clay of good decolorizing properties, although other decolorizing materials may be used. The petrolatum may be neutralized before filtration, if necessary.

Instead of using crude petrolatum as the stock to be treated, any other suitable petrolatum-yielding material may be used. In some cases it is desirable to mix with the petrolatum stock a hydrocarbon material, liquid at ordinary temperature, which may or may not be relatively inert to sulfuric acid, such as white oil distillates or finished white oil. This material passes through the operation with the petrolatum and imparts the desired consistency to the finished product.

The process may be operated either upon batches of material or continuously. Atmospheric pressure is suitable, but other pressures are not precluded. Several agitators and extraction tanks may be provided, if desired. The steaming of the petrolatum may take place as a separate operation instead of as an incident to the expulsion of the solvent. Steam stills of ordinary type may be used instead of the stripping column, but the latter is preferred when the operation is to be conducted continuously.

The sulfur dioxid evolved during the reaction may be recovered in any suitable way, for example by absorption or liquefaction. Any naphtha or other solvent vapors coming off with the sulfur dioxid may also be recovered. When desired, pressure may be maintained in the reaction chamber.

The procedures described are illustrative of preferred forms of the invention, but various modifications may be made within the scope of the appended claims, in which it is our intention to claim all novelty inherent in the invention, as broadly as the prior art permits.

We claim:

1. Process of preparing white petrolatum, comprising dissolving a petrolatum-yielding material, reacting with fuming sulfuric acid upon the solution so formed, withdrawing the sludge produced by the acid reaction, separating the solvent, and recovering the pure petrolatum.

2. Process according to claim 1, in which the acid treatment of the petrolatum is conducted in naphtha solution.

3. Process of preparing white petrolatum, comprising reacting upon a petrolatum-yielding hydrocarbon material, dissolved in a solvent of relatively low boiling point, with fuming sulfuric acid, separating the sludge produced by the acid reaction, extracting the reaction mixture with a solvent for sulfonic bodies, expelling the solvent and any residual extraction agent, and recovering the petrolatum.

4. Process according to claim 3, in which the solvent for sulfonic bodies is an aqueous solution of isopropyl alcohol.

5. Process of preparing white petrolatum, comprising dissolving crude petrolatum in naphtha, adding fuming sulfuric acid to the petrolatum solution so formed, agitating, allowing to settle, withdrawing sludge formed by the acid reaction, extracting the petrolatum solution with a solvent for sulfonic bodies, withdrawing the extracted solution, subjecting the extracted solution to a temperature sufficient to expel the solvent, and passing the petrolatum through a body of finely divided decolorizing material.

6. Process according to claim 5, in which the solution comprises about 10 parts by weight of petrolatum and 90 parts by weight of naphtha.

7. Process according to claim 5, in which the acid is added in several portions with withdrawal of sludge after each addition of acid.

ERNEST B. COBB.
AUGUST HOLMES.